(12) United States Patent
Speggiorin et al.

(10) Patent No.: US 12,025,906 B2
(45) Date of Patent: Jul. 2, 2024

(54) TRIPOD FOR VIDEO-PHOTOGRAPHIC EQUIPMENT

(71) Applicant: VITEC IMAGING SOLUTIONS S.P.A., Cassola (IT)

(72) Inventors: Paolo Speggiorin, Mussolente (IT); Stelvio Zarpellon, Bassano del Grappa (IT); Michele Brasca, Cassola (IT); Fabio Facchinato, Arsie' (IT)

(73) Assignee: Vitec Imaging Solutions S.P.A., Cassola (IT)

( * ) Notice: Subject to any disclaimer, the term of this patent is extended or adjusted under 35 U.S.C. 154(b) by 204 days.

(21) Appl. No.: 17/770,245

(22) PCT Filed: Oct. 15, 2020

(86) PCT No.: PCT/IB2020/059697
§ 371 (c)(1),
(2) Date: Apr. 19, 2022

(87) PCT Pub. No.: WO2021/079237
PCT Pub. Date: Apr. 29, 2021

(65) Prior Publication Data
US 2022/0291574 A1    Sep. 15, 2022

(30) Foreign Application Priority Data
Oct. 23, 2019    (IT) .......................... 102019000019691

(51) Int. Cl.
*F16M 11/00*    (2006.01)
*F16M 11/26*    (2006.01)
*G03B 17/56*    (2021.01)

(52) U.S. Cl.
CPC ........... *G03B 17/561* (2013.01); *F16M 11/26* (2013.01)

(58) Field of Classification Search
CPC ...... G03B 17/561; F16M 11/26; F16M 11/34; F16M 2200/08; F16B 7/1454
See application file for complete search history.

(56) References Cited

U.S. PATENT DOCUMENTS 5,253,833 A * 10/1993 Indou ..................... F16M 11/36
248/188.5
5,320,316 A * 6/1994 Baker .................... F16M 11/36
248/163.1

(Continued)

FOREIGN PATENT DOCUMENTS

| EP | 2251583 A1 | 11/2010 |
| GB | 2210259 A | 6/1989 |
| WO | 02090819 A2 | 11/2002 |

*Primary Examiner* — Amy J. Sterling
(74) *Attorney, Agent, or Firm* — Volpe Koenig (57) ABSTRACT

A support for video-photographic equipment includes: at least one leg telescopically extendible between a retracted configuration and an extended configuration and has a first section, a second section engaged in a sliding manner with the first section; and a third section engaged in a sliding manner with the second section; a blocking device on one of the sections of the leg, interacting with the above-mentioned sections to block or unblock relative axial sliding thereof and is provided with a control element connected to the second section and actuable to control the blocking device, a transmission device connecting the first, second and third sections, and includes at least first and second redirection elements secured to the second section in longitudinally opposite positions, a securing element fixed to the third section and at least one wire extending between the first and second redirection elements and the securing element.

14 Claims, 6 Drawing Sheets

(56) References Cited

U.S. PATENT DOCUMENTS

| | | | | |
|---|---|---|---|---|
| 5,887,835 | A * | 3/1999 | Hein | F16M 11/26 |
| | | | | 248/161 |
| 6,082,685 | A * | 7/2000 | Hein | F16M 11/26 |
| | | | | 248/161 |
| 6,942,187 | B2 * | 9/2005 | Blackburn | F16M 11/32 |
| | | | | 248/163.1 |
| 7,654,494 | B2 * | 2/2010 | Cartoni | G03B 17/561 |
| | | | | 248/163.1 |
| 8,292,240 | B2 | 10/2012 | Hein et al. | |
| 11,067,225 | B2 * | 7/2021 | He | F16M 13/04 |
| 11,774,035 | B2 * | 10/2023 | Fiore | F16B 7/1454 |
| | | | | 248/157 |

* cited by examiner

TRIPOD FOR VIDEO-PHOTOGRAPHIC EQUIPMENT

TECHNICAL FIELD

The present invention relates to a tripod for video-photographic equipment, having the features set out in the preamble of the main claim.

TECHNOLOGICAL BACKGROUND

Tripods are support devices which are commonly used in the field of photography and generally comprise a plurality of telescope-like legs which are all hinged at a respective end thereof to a cross-member, on which, for example, a support head for the video-photographic equipment can be mounted.

Tripod legs generally comprise at least three sections which are engaged with each other in order to slide in a telescope-like manner one in the other and which are capable of rapidly changing from a compact configuration, which is advantageous for transport and storage of the tripod, to an extended configuration, in which the tripod can be used as a stable support for the video-photographic equipment.

There are further provided between one section and the other of the extensible legs respective blocking devices, which can be operatively controlled by the user in order to block or alternatively unblock the relative sliding between consecutive sections, therefore allowing the change between the above-mentioned compact and extended configurations and further controlling the degree of relative extension of each pair of sections.

There are further known in the sector tripods in which the blocking devices of the telescope-like sections of the legs can be controlled at the same time by a single control element so that the user can advantageously actuate, with a single movement, the blocking and/or unblocking of all the telescope-like sections of the leg.

There are known embodiments of tripods which have a single blocking or unblocking control for the telescope-like sections of the legs.

In such tripods, after unblocking the single sections with the single blocking control, the operator provides for moving the section or the sections of the extensible legs which he/she intends to move in order to obtain the overall extension desired for the telescope-like legs. The operator moves each section by a desired amount.

This involves, particularly in some cases, the adjustment of the height of the legs being quite difficult and inconvenient for the operator.

In fact, in order to position the known tripods, after unblocking the blocking control, it is necessary to grip and move all three sections and to move them until they reach the overall height desired for the tripod and, subsequently, to block the blocking control in order to block the legs at the desired extension.

The term "section" of a leg is intended to be understood to mean a rigid portion of the leg which extends longitudinally along the axis of the leg and which can slide axially with respect to other similar portions. A section may comprise a single tube or a plurality of tubes which are parallel with the axis of the leg.

The term "wire" is intended to be understood to be an element having a flexible body having a longitudinal dimension which is considerably greater than the other two dimensions and having a section which is almost circular or flattened.

STATEMENT OF INVENTION

The problem addressed by the present invention is to provide a tripod for video-photographic equipment which is structurally and functionally configured to at least partially overcome one or more of the limitations set out above with reference to the cited prior art.

This problem is solved by the present invention by means of a tripod which is constructed according to the appended claims.

In a first aspect thereof, therefore, the present invention is directed towards a support for video-photographic equipment, comprising at least one leg which can extend in a telescope-like manner between a retracted configuration and an extended configuration, wherein the leg comprises a first section, a second section which is engaged in an axially sliding manner with the first section and a third section which is engaged in an axially sliding manner with the second section.

Preferably, the support comprises a blocking device which is provided on the second section of the leg and which is intended to interact with the first, second and third sections in order to block or unblock the relative axial sliding thereof.

Furthermore, the support preferably comprises a control element for the blocking device which is connected to the second section and which can be actuated in order to control the blocking or the unblocking of the blocking device.

The control element is provided on the second section and is fixedly joined in terms of longitudinal translational movement with respect to the second section.

In this manner, by acting on the control element it is possible to actuate the blocking device in order to block/unblock at the same time all the sections of the leg and it is also possible to make the movable sections of the leg movable.

The support advantageously comprises a transmission device which connects the first, second and third sections of the leg in such a manner that the movement of the second section with respect to the first section brings about a similar movement of the third section with respect to the second section.

In this manner, by moving one of the sections of the leg it is also possible to move at least one other section of the leg by pulling it along. The overall extension of the leg is therefore modified in a simple manner.

By moving one of the sections of the leg by a desired movement amount, at least one other section of the leg is moved by a corresponding amount, preferably coincident with this amount of movement.

The transmission device preferably comprises at least a first redirection element and a second redirection element which are secured to the second section in longitudinally opposite positions, a first and a second securing element which are fixed to the first and third sections and at least one wire which extends between the first redirection element and the second redirection element and the first and the second securing elements in order to transmit the movement between the first section, second section and third section of the leg.

In this manner, as a result of the transmission device, by acting on the second or third section it is possible to move both the second and the third sections of the leg at the same time in order to adjust the overall height of the leg itself. In this manner, as a result of the transmission device, by acting on the second section it is also possible to move the third section at the same time, and vice versa.

For example, it is possible to act only on the section which is most easily reachable by the operator, for example, the movable section furthest away from a support foot of the leg.

In this manner, with a single movement, it is possible to move all the movable sections of the leg by adjusting the position thereof with respect to the first section and therefore by adjusting the overall extension of the leg.

In this manner, with a single movement, it is possible to move all the movable sections of the leg by extending or retracting all of them by a corresponding movement amount, preferably all by an equivalent movement amount, that is to say, having the same length.

Furthermore, the operator can, by acting on the control element, unblock the blocking device, move in translation the sections of the leg until the desired overall extension is reached for the leg itself and block the blocking device.

These operations can be readily carried out without moving the hand from the control element.

This allows the leg to be positioned with the maximum speed and convenience and without risking accidental falls or without having to carry out complicated manoeuvres.

Therefore, the ergonomics of the support of the invention is maximized.

This facilitates the operations for adjusting the support of the invention by the user.

Furthermore, the presence of two different redirection elements allows a uniform movement to be obtained without jerks.

The presence of two different securing elements allows the transmission device to be made particularly stable and secure.

The transmission of the movement between the different sections of the leg is further optimized.

In the above-mentioned aspect, the present invention may further have one or more of the preferred features described below.

In a preferred version, the first section comprises a an external shell member which is internally hollow and in which there is slidingly received the second section.

Preferably, the external shell member is provided with a longitudinal slot.

Preferably, the second section comprises a second intermediate shell member which is received in a sliding manner in the external shell member of the third section and which slidably receives the third section.

The third section comprises an internal shell member which has a preferably box-shaped configuration and which is slidingly received in the intermediate shell member of the second section.

In this version, the transmission device is received inside the intermediate shell member.

In this manner, the elements of the transmission device are not visible from the exterior and are also suitably protected from possible impacts without additional protection components being provided.

It is preferably possible to adjust the position of at least one of the redirection elements in order to adjust the tension of the wire which extends between them.

Advantageously, the first redirection element comprises an idler pulley which is mounted so as to be rotatable on the second section at a first longitudinal end thereof.

Advantageously, the second redirection element comprises an idler pulley which is mounted so as to be rotatable on the second section at a second longitudinal end thereof opposite the first end.

The first securing element preferably comprises a clamp which is fixed to the third section and which is intended to block a securing portion of the wire at the third section in order to prevent the relative sliding of the wire with respect to the third section.

The second securing element preferably comprises a clamp which is fixed to the first section and which is intended to block an additional securing portion of the wire at the first section in order to prevent the sliding of the wire with respect to the first section.

The wire may be a cord or a belt or cable and may have a cross-section which is substantially circular or flattened.

In a preferred embodiment, the wire is formed as a belt which is formed in the manner of a ring and which extends between the redirection elements and the securing elements.

In another preferred version, the wire comprises a first wire portion which extends between the first redirection element and the first securing element and a second wire portion which is separate and different from the first wire portion and which extends between the second redirection element and the second securing element.

In another preferred version of the leg, the first section comprises a pair of external parallel tubes.

Preferably, the second section is formed by a pair of intermediate parallel tubes which are substantially coplanar with the external tubes of the first section and which are interposed between the external tubes of the first section.

Preferably, the third section is formed by a single slidable internal tube.

This type of construction allows the provision of legs which are more rigid and consequently a tripod which is more stable, a characteristic which is particularly important when the equipment which is mounted on the tripod is moved during use, for example, during a panoramic video shot.

In this version, the transmission device is received between one of the external tubes and one of the intermediate tubes.

In this version, the elements of the transmission device are also protected from possible impacts without additional protection components being provided.

Advantageously, the first section is provided, at a longitudinal end thereof, which during use is opposite a support surface directed towards a video-photographic equipment item, with a reinforcement element which connects the ends of the external tubes and which defines a sliding cavity for the sliding of the intermediate tubes of the second section and a second sliding cavity for the sliding of the internal tube of the third section.

Advantageously, the second section is provided, at a longitudinal end thereof, which during use is opposite a support surface of a video-photographic equipment item, with an additional reinforcement element which connects the ends of the intermediate tubes of the second section and which defines a sliding seat for the sliding of the internal tube of the third section.

Preferably, the blocking device comprises a first blocking device which is configured to act between the first section and the second section in order to block or unblock the relative axial sliding thereof and a second blocking device which is provided between the second section and the third section in order to block or unblock the relative axial sliding thereof.

Preferably, the tripod further comprises a control element which is connected to the first blocking device in order to control the blocking or unblocking thereof.

Preferably, the tripod further comprises a transfer element which connects the first and the second blocking device in such a manner that the actuation of the first blocking device brings about a similar movement of the second blocking device so that the blocking or unblocking of the first and second blocking device are substantially simultaneous.

The control element is preferably fixedly joined in terms of translational movement along the longitudinal axis of the leg to the second section thereof in such a manner that, by acting on the control element, the second section can be moved in translation with respect to the first section along the longitudinal axis of the leg.

The first blocking device comprises a first housing which is fixed at a first end of the second section and which is directed towards a support surface of the support which is intended to receive a video-photographic equipment item.

Preferably, the first blocking device comprises a first runner which is movable away from and towards the first section in order to block or unblock the relative sliding action thereof.

Preferably, the first blocking device comprises a first actuator which is connected to the control element and the first runner so as to move the first runner away from and towards the first section when the first actuator is moved by the control element.

Preferably, the second blocking device also comprises a second housing which is fixed at a second end of the second section, opposite the first end, and therefore directed towards a base of the leg.

Preferably, the second blocking device comprises a second runner which can be moved away from and towards the third section in order to block or unblock the relative sliding thereof with respect to the second section and a second actuator which is connected to the second runner and the transfer element in such a manner that the second runner is moved away from and towards the third section when the second actuator is moved by the transfer element.

Preferably, the second runner is moved away from and towards the third section following an oscillation of the second actuator brought about by the movement of the transfer element.

The first and second runners are similar to each other and are preferably moved in translation against the tube (or tubes) which form(s) the section to be blocked.

The first and second runners can come into direct contact with the tube(s) to be blocked or, in a preferred version, they can push, for each tube, a pair of braking elements which are axially spaced apart in a direction which has both a radial component (in order to clamp the tube against the respective sliding seat formed in the housing of the blocking device) and an axial component (in order to block any oscillations of the tube inside the housing of the blocking device, taking up play and dimensional tolerances).

In particular, it is preferable for the first runner to be moved away from and towards the first section following an oscillation of the first actuator brought about by the actuation of the control element.

There is preferably provision for the first and second runners to move in a radial direction in order to block the sections of the leg.

There may be provided a spring or other resilient element in order to urge the first runner and/or the second runner in a direction away from the respective section to be blocked.

The first actuator comprises a cam element which can oscillate about a rotation axis thereof by means of the control element.

The control element is preferably a lever which is intended to be actuated by the operator and it is preferably securely fixed to the cam element.

Preferably, the cam element is connected to the first runner by means of a tie rod which, in a greatly preferred manner, is connected to the cam element at the rotation axis thereof.

Preferably, the transfer element is connected to the cam element in an eccentric position with respect to the rotation axis. In this manner, when the cam element is oscillated about the rotation axis thereof, the transfer element is moved along an arcuate trajectory.

Preferably, the cam element runs, during the oscillation movement thereof, against the first section so that the eccentricity of the external surface thereof brings about a movement of the cam element inside the first housing. The provision of the tie rod allows transmission of this movement to the runner which is moved towards the first section.

In a version, the telescope-like leg is provided with a number of telescope-like sections other than three, the transmission device being configured to transmit the movement between all the sections of the leg in such a manner that, by moving one of the sections of the leg, a corresponding movement of the other sections thereof is caused.

BRIEF DESCRIPTION OF THE DRAWINGS

The features and advantages of the invention will be better appreciated from the detailed description of a number of preferred embodiments thereof which are illustrated by way of non-limiting example with reference to the appended drawings, in which.

PREFERRED EMBODIMENT OF THE INVENTION

Initially with reference to FIGS. 1 to 7, there is generally designated 1 a tripod which is constructed according to a first embodiment of the present invention.

It may initially be noted that, though in the following description reference is made to a tripod for video-photographic equipment, the invention may also be carried out on a support structure for video-photographic equipment having a single support leg, so-called monopods.

Figures 1, 2:
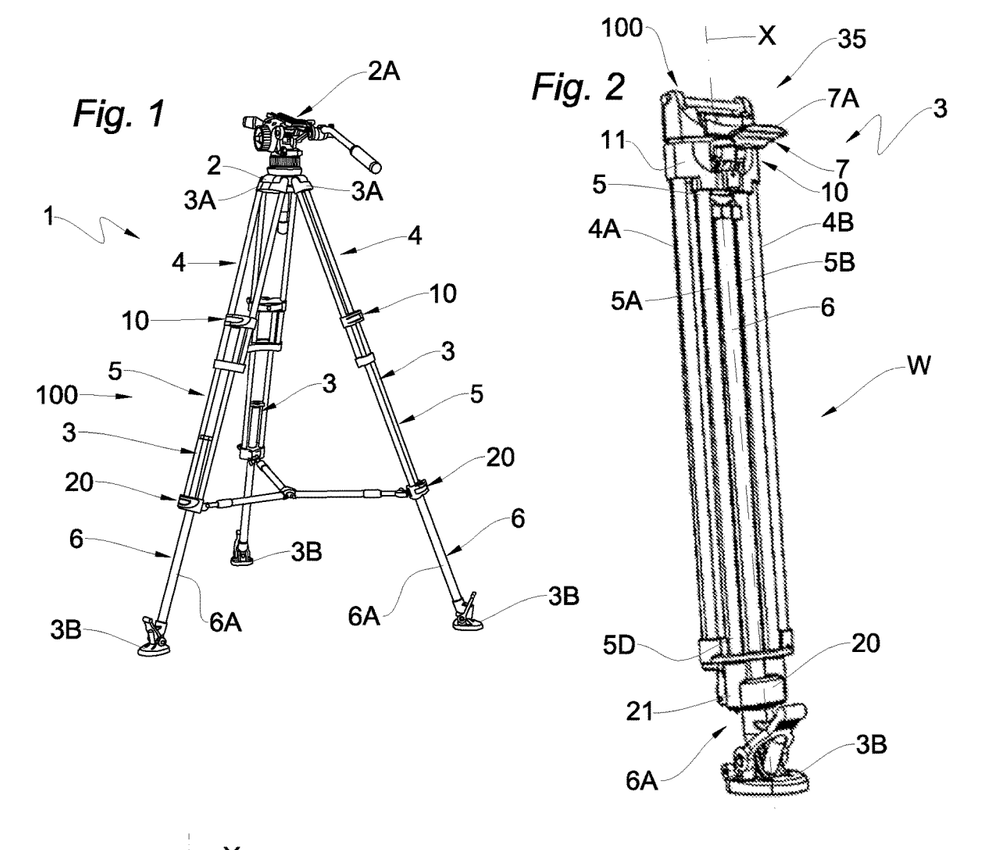
FIG. 1 is a perspective view of a tripod for video-photographic equipment, in an extended and open configuration, constructed according to a first embodiment of the present invention.
FIG. 2 is a perspective view of a leg of the tripod of FIG. 1 in a compact configuration W.

The tripod 1 comprises a cross-member 2, to which there are articulated a plurality of legs which are all designated 3 and each of which is articulated to the cross-member 2 at a first end 3A, while an opposite second end is provided with a foot 3B which forms the support base of the leg 3.

A support head 2A can be suitably mounted on the cross-member 2 for a video-photographic equipment item according to methods which are known in the sector.

Each leg 3 is articulated to the cross-member 2 in an oscillating manner between an open configuration, in which the legs 3 are moved away from each other so as to increase the support plane of the tripod 1 on the ground, and a closed or compact transport configuration, in which the legs 3 are moved towards each other.

Each leg 3 extends along an individual longitudinal axis X and is extensible in a telescope-like manner along the longitudinal axis X between a compact transport configuration W shown in FIG. 2 and a plurality of extended configurations for use, one of which is shown in FIG. 1.

Figure 3:
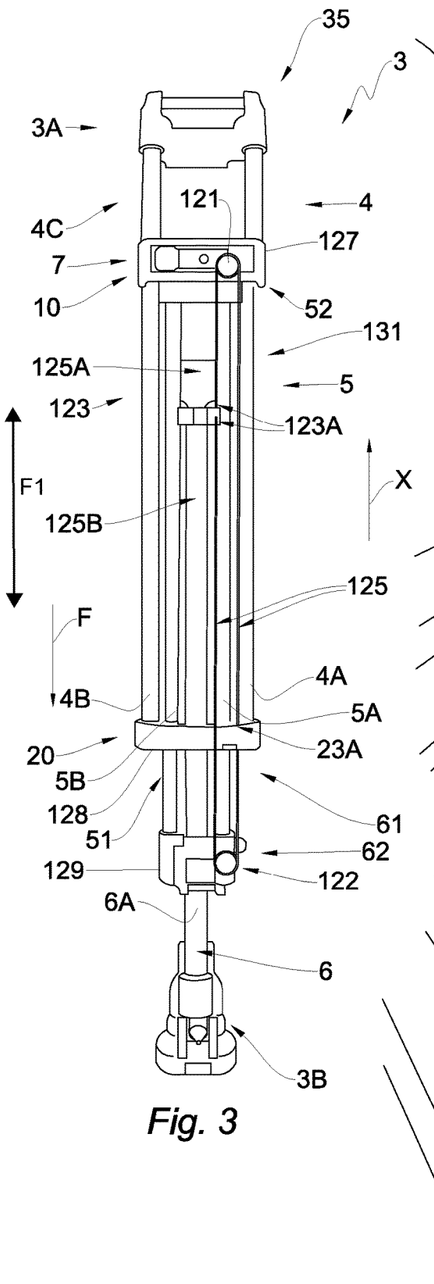
FIG. 3 is a front view of a leg of the tripod of FIG. 1.
Figure 3A:
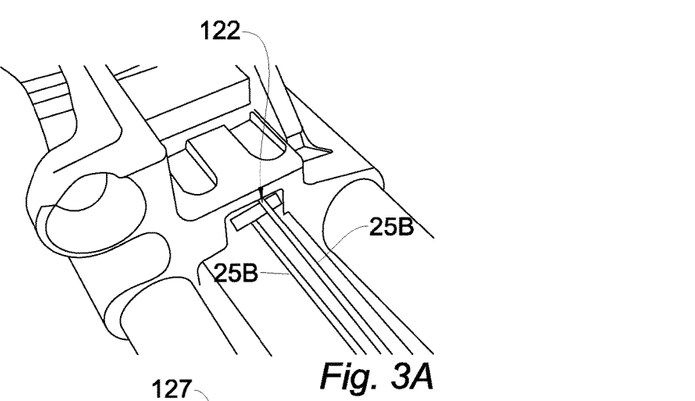
FIGS. 3A-3C are enlarged views of a detail of FIG. 3.
Figure 3B:
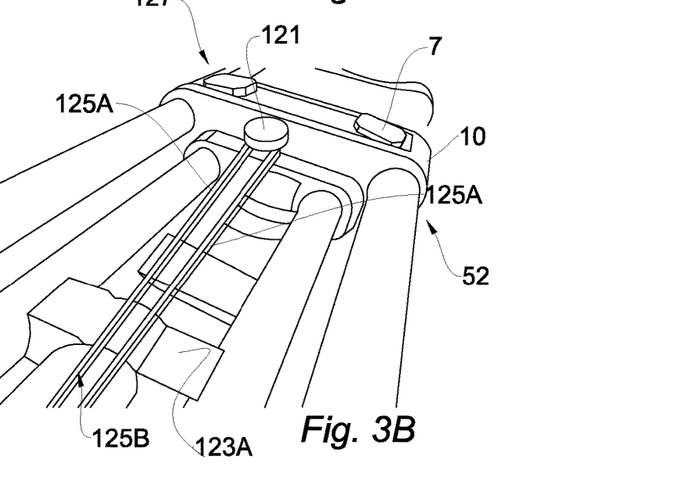
Figure 3C:
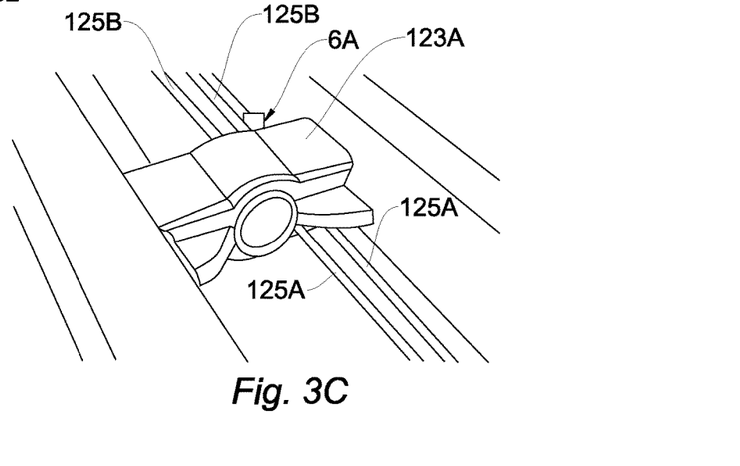

In a general version, each leg comprises a fixed section which is intended to be articulated to the cross-member 2 or provided with a support element for video-photographic equipment, and a plurality of movable sections which can be moved in translation with respect to the fixed section, as indicated by the arrow F1 in FIG. 3.

In the version shown, each leg 3 comprises a first section 4 which is articulated to the cross-member 2, a second section 5 which is engaged in an axially sliding manner with the first section 4 and a third section 6 which is engaged in an axially sliding manner with the second section 5 and on which the foot 3B is mounted.

The first section 4 is provided at a first longitudinal end 4C thereof, which is directed towards the cross-member 2, with a hinge element 35, by means of which the leg 3 is articulated to the cross-member 2. The first section 4 is fixed in terms of translational movement with respect to the cross-member 2.

In this version, each leg 3 comprises three sections, in which the first section 4 comprises a pair of parallel external tubes 4A and 4B, the second section 5 comprises a pair of parallel intermediate tubes 5A and 5B, which are slidingly interposed between the external tubes 4A and 4B, and the third section 6 comprises a single internal tube 6A which is slidingly interposed between the intermediate tubes 5A and 5B.

The intermediate tubes 5A, 5B are substantially coplanar with the external tubes 4A, 4B of the first section and are interposed between the external tubes 4A, 4B of the first section.

The slidable internal tube 6A is substantially coplanar with the intermediate tubes 5A, 5B and is interposed therebetween.

The first section 4 is provided at a longitudinal end 4D thereof, which is opposite the cross-member 2 during use and therefore a support surface of a video-photographic equipment item, with a reinforcement element 128 which connects the ends of the external tubes 4A, 4B and which is formed so as to define a sliding cavity 51 for the sliding of the intermediate tubes 5A, 5B of the second section 5 and a second sliding cavity 61 for the sliding of the internal tube 6A of the third section 6.

Advantageously, the second section 5 is provided at a longitudinal end 5D thereof, which is opposite the cross-member 2 during use, that is to say, opposite a support surface of a video-photographic equipment item, with an additional reinforcement element 129 which connects the ends of the intermediate tubes 5A, 5B of the second section, which are directed at the opposite side with respect to the cross-member 2, and which defines a sliding seat 62 for the sliding of the internal tube 6A of the third section 6.

The second section 5 is further provided, at the longitudinal end 5C thereof directed towards the cross-member 2 during use, that is to say, a support surface of a video-photographic equipment item, with a connection element 127 which connects the intermediate tubes 5A, 5B of the second section 5 and which defines an additional sliding cavity 52 for the sliding of the external tubes 4A, 4B of the first section 4.

Each leg 3 further comprises a blocking device 100 which is configured to block/unblock the relative sliding between the three sections 4-6 of the leg 3, as better explained below.

By acting on the blocking device 100, the three telescope-like sections 4-6 of the leg 3 can be blocked in a desired relative position and, vice versa, unblocked in order to be mutually moved, in both directions of the arrow F1, in order to vary the overall extension of the leg 3, as better explained below.

The blocking device 100 comprises a control element 7 which is intended to be actuated by an operator in order to block/unblock the blocking device 100 and gripped in order to move the movable sections of the leg 3 with respect to the fixed section 4.

The control element 7 is fixedly joined in terms of translational movement along the longitudinal axis X to one of the movable sections of the leg 3 so as to be able to control the translational movement of the movable sections with respect to the fixed section along the longitudinal axis X of the leg 3.

Figure 4:
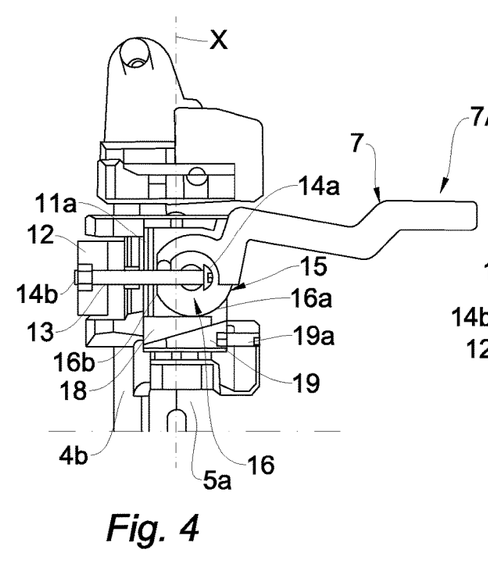
FIG. 4 is a partial, axially sectioned view, drawn to an enlarged scale, of a first blocking device of the leg of FIG. 2.
Figure 5:
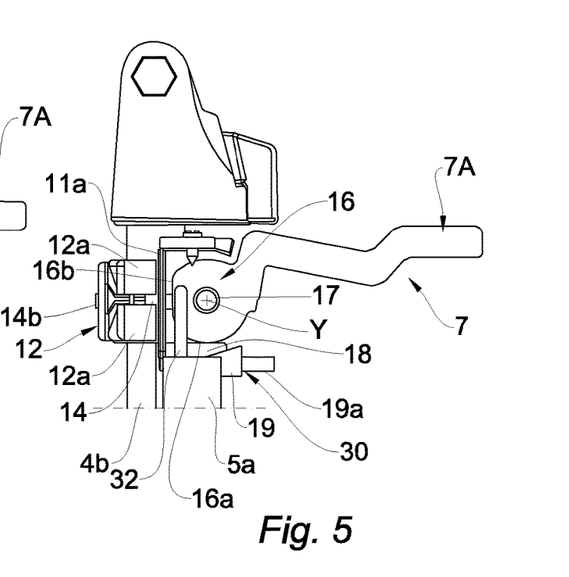
FIG. 5 is a side view of the first blocking device of FIG. 4 with some components being removed for clarity.
Figure 6:
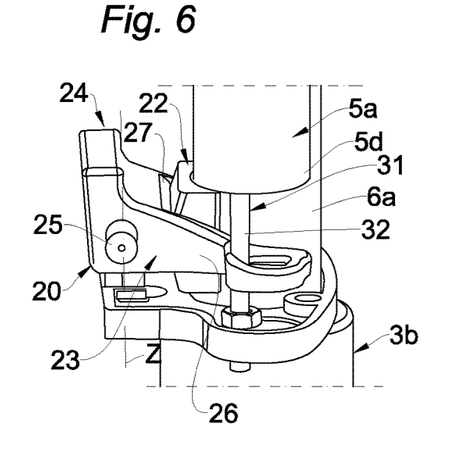
FIG. 6 is a side view of a second blocking device of the leg of FIG. 2, in which some components have been removed for clarity.

In the version shown, the blocking device 100 comprises a first blocking device 10 which is fixed at the connection element 127, which can better be seen in FIGS. 3 and 4, and which is intended to block/unblock the first section 4 and the second section 5 and a second blocking device 20, which is fixed at the reinforcement element 128, and which can better be seen in FIGS. 5 and 6, and which is intended to block/unblock the second section 5 and the third section 6 and a transfer element 31 which is interposed between the first blocking device 10 and the second blocking device 20 in order to transmit the movement of the first blocking device 10 to the second blocking device 20.

The first blocking device 10 is provided between the first section 4 and the second section 5 in order to block/unblock the relative sliding between the two sections, the second blocking device 20 is provided between the second section 5 and the third section 6 for the same purpose.

The first blocking device 10 comprises a housing 11 which is box-shaped and in which there are formed the additional sliding cavities 52 for the external tubes 4A and 4B of the first section 4.

The first blocking device 10 further comprises a first runner 12 which is movable inside the first housing 11 towards the external tubes 4A and 4B, in a direction substantially perpendicular to the longitudinal axis X, so as to press it against the respective seats of the first housing 11 and to block the sliding thereof. In particular, the first runner 12 acts on the external tubes 4A and 4B by pressing against the respective pairs of braking elements 12a which are moved by the first runner 12 in a direction which has both a component perpendicular to the axis X so as to abut the external tube 4A or 4B and a component parallel with the axis X so as to be placed against the first housing 11 and to limit any oscillations of the external tube 4A, 4B inside the first housing 11.

A spring 13 is interposed between the first housing 11 and the first runner 12 in order to urge it away from the external tubes 4A, 4B.

The first runner 12 is further connected with a tie rod 14 to a first actuator 15, which is provided inside the first housing 11 at the side opposite the first runner 12 with respect to the external tubes 4A, 4B.

The first actuator 15 comprises a cam element 16 which can oscillate about a pin 17 which has an axis Y and to which the tie rod 14 is fixed. The external surface of the cam element 16 has a profile which is generally eccentric with a substantially cylindrical portion 16a and a smooth portion 16b.

The tie rod 14 is a threaded pin which extends through the pin 17 and the first runner 12, which is provided with a head 14a which abuts the pin 17 and which can be manoeuvred by a user and which is screwed on a block 14b which is positioned outside the first runner 12 at the side opposite the pin 17.

The cam element 16 faces, at the side of the first runner 12, a wall 11a of the first housing 11.

The cam element 16 is further supported on a slider 18 which is movable in a limited manner inside the first housing 11 in a direction parallel with the axis X so as to move the first actuator 15 in this direction.

To this end, the slider 18 is in turn supported on a wedge 19, which is movable in a direction perpendicular to the axis X as a result of the action of a threaded pin 19a, which can be actuated by the user by means of an operating key.

The wedge 19 and/or the slider 18 are in mutual contact at an inclined surface so that the movement of the wedge 19 in a direction perpendicular to the axis X involves the movement of the slider 18 in a direction parallel with the axis X.

The slider 18, the wedge and the threaded pin 19 generally form an adjustment member 30 of the second blocking device 20, as better explained below.

The first actuator 15 is further connected to a control element 7 which extends from the cam element 16 at the side opposite the runner 12.

The control element 7 is formed by a control lever which can be actuated by an operator and which controls the cam element 16 in an oscillating manner about the axis Y.

The control element 7 comprises a gripping portion 7A which is intended to be gripped by an operator in order to move the control element 7 in order to block/unblock the first blocking device 10 and to move the sections 4-6 of the leg 3, as better described below.

The actuator 15 is further connected to the second blocking device 20 by means of a transfer element 31 which comprises a pair of rods 32 which are fixed to the cam element 16 in an eccentric position with respect to the rotation axis Y.

The rods 32 extend from the cam element 16 as far as the second blocking device 20 through the intermediate tubes 5A and 5B.

The second blocking device 20 is provided at the reinforcement element 128 and comprises a second housing 21 which is fixed to a second end 5D of the second section 5 opposite the first end 5C.

The second blocking device 20 comprises a second runner 22 which is movable away from and towards the internal tube 6A and a second actuator 23 which is connected to the second runner 22 in order to control the movement thereof.

The second actuator 23 comprises a lever 24 which can oscillate about a pin 25 which has an axis Z and which is rotatably supported on the second housing 21. The lever 24 comprises two arms 26 which are parallel and which extend from the pin 25 at opposite sides to the internal tube 6A and which are connected to the rods 32 of the transfer element 31. The lever 24 abuts the second runner 22 at an appendage 27 so that, when the lever 24 is oscillated about the axis Z, the appendage 27 urges the second runner 22 against the internal tube 6A.

When the control element 7 is in a raised position, the blocking device 100 is open so that the sections 4, 5 and 6 of the leg 3 can freely slide with respect to each other.

When the control element 7 is in a raised position, it is arranged transversely with respect to the longitudinal axis X of the sections of the leg 3 and it can readily be gripped and manoeuvred by the operator.

In this position (FIGS. 4 and 5), the first runner 12 and the second runner 22 are spaced apart from the external tubes 4A, 4B and the internal tube 6A, respectively, and the cam element 16 has the smooth portion 16b thereof facing the wall 11a.

Figure 7:
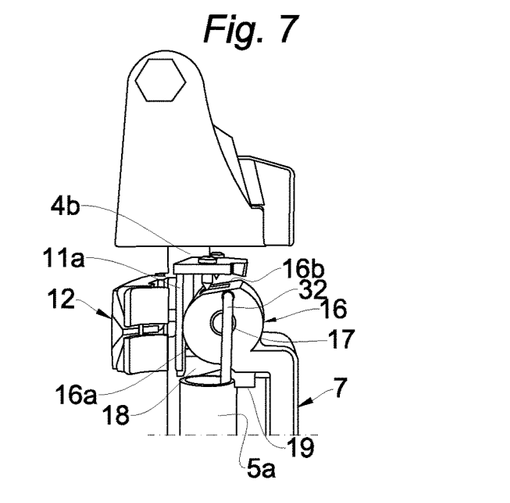
FIG. 7 is a view similar to FIG. 5, with the blocking device closed, respectively.
Figures 8, 9:
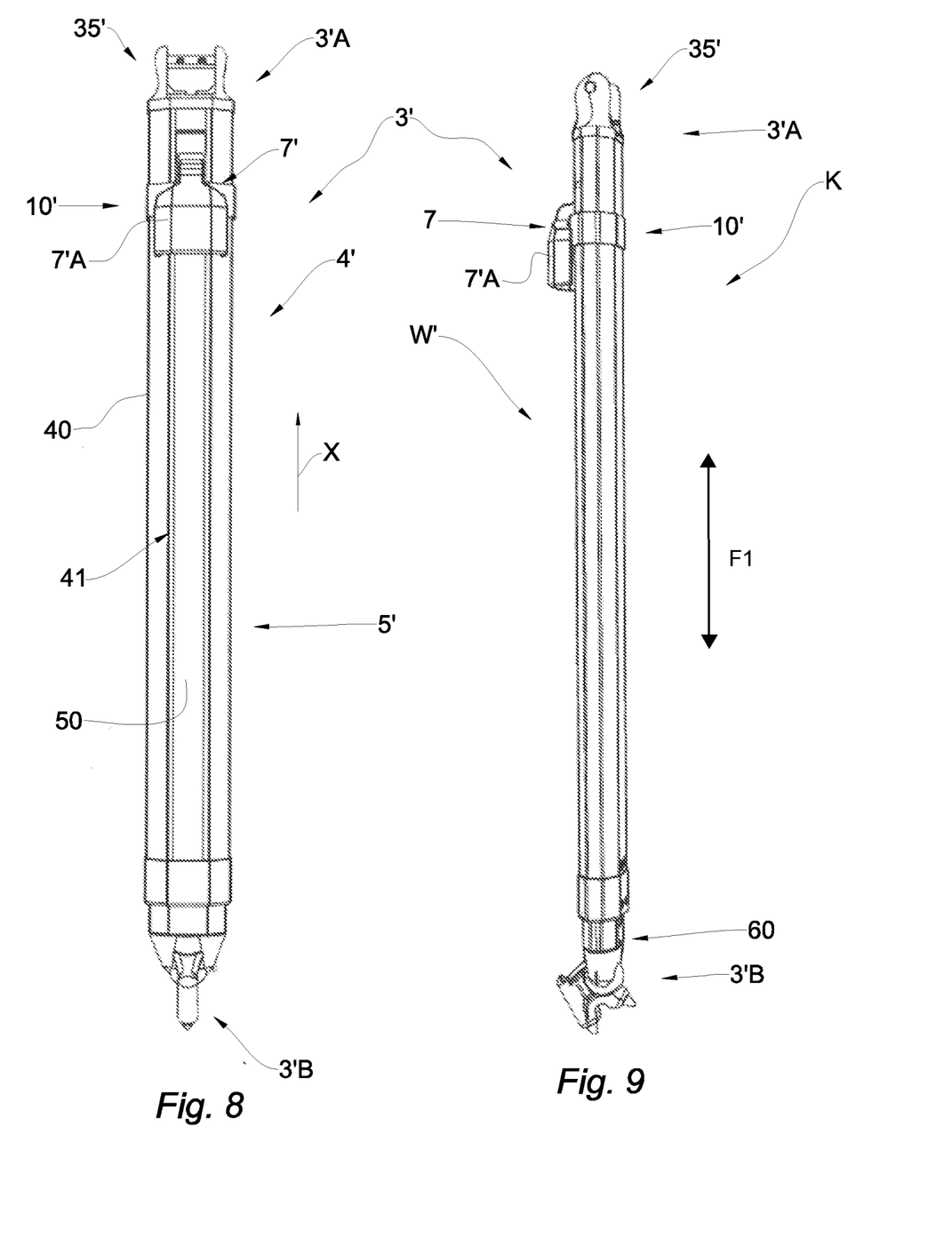
FIG. 8 and FIG. 9 are a front view and a perspective view of a leg of a support for video-photographic equipment constructed according to a second embodiment of the present invention, in a compact configuration, respectively.

When the control element 7 is lowered into a closure position, see FIG. 7, the cam element 16 is oscillated about the rotation axis Y and abuts the wall 11a with the cylindrical portion 16a thereof, moving the pin 17 away from the wall 11a. This brings about traction of the tie rod 14 and the consequent movement of the first runner 12 towards the external tubes 4A and 4B.

At the same time, the oscillation of the cam element 16 causes the movement of the rods 32 which in particular are raised towards the cross-member 2. This brings about a resultant lifting of the arms 26 of the lever 24, the oscillation thereof about the axis Z and the movement of the second runner 22 against the internal tube 6A which is caused by the pushing action of the appendage 27.

In this manner, as a result of the transfer element 31, the movement of the control element 7 brings about the simultaneous actuation of the first blocking device 10 and the second blocking device 20.

Owing to the transfer element 31, by actuating the control element 7 of the blocking device 100, the first blocking device 10 and the second blocking device 20 are blocked/unblocked simultaneously, that is to say, the second section 5 and the third section 6 of the leg 3.

The adjustment of the gripping load of the first blocking device 10 is brought about by screwing the tie rod 14 on the block 14b by acting with an operating key on the head 14a. The screwing action or unscrewing action of the tie rod 14 on the respective block 14b varies the distance of the first runner 12 with respect to the cam element 16.

The adjustment of the gripping load of the second blocking device 20 is instead brought about by moving the wedge 19 and therefore the slider 18 by means of the threaded pin 19a. The movement of the slider 18 causes similar movement along the axis X of the cam element 16 and consequently also of the rods 32 which are connected thereto and which in turn oscillate the lever 24 by moving the second runner 22 closer to or further away from the internal tube 6A.

The leg 3 is further provided with a transmission device 131 which connects the first section 4, the second section 5 and the third section 6 in such a manner that a movement of the second section 5 with respect to the first section 4 brings about a similar movement of the third section 6 with respect to the first section 4, as better explained below.

The transmission device 131 is operatively connected to the blocking device 100.

The transmission device 131 comprises a first redirection element 121 and a second redirection element 122 which are secured to the second section 5 in longitudinally opposite positions 5C, 5D.

The first redirection element 121 is formed as an idler pulley which is rotatably mounted on the first longitudinal end 5C of the intermediate section 5 and which is rotatable about an axis Y which is perpendicular to the longitudinal axis X of the leg 3.

Advantageously, the first redirection element 121 is provided at the connection element 127.

The second redirection element 122 is formed as a second idler pulley which is rotatably mounted on a second longitudinal end 5D of the intermediate section 5 and which is rotatable about an axis Y which is perpendicular to the longitudinal axis X of the leg 3.

Preferably, the second redirection element 122 is provided at the reinforcement element 129.

The transmission device 131 further comprises a wire 125 which extends between the first redirection element 121 and the second redirection element 122 in order to transmit the movement between the second section 5 and the third section 6 of the leg 3, as better explained below.

The transmission device 131 further comprises a securing device 123 for securing the wire 125 to the first section 4 and/or third section 6.

The securing device 123 comprises a first securing element 123A which is fixed to the third section 6 and which is intended to fix the wire 125 to the third section 6.

The securing device 123 further comprises a second securing element 123B which is fixed to the first section 4 and which is intended to fix the wire 125 to the first section 4. Preferably, the second securing element 123B is provided at the reinforcement element 128.

The first securing element 123A and the second securing element 123B are formed so as to block the sliding of the wire 125 in relation to the third section 6 and the first section 4, respectively.

The wire 125 comprises a first wire portion 125A which extends between the first securing element 123A as far as the second securing element 123B via the first redirection element 121 and a second wire portion 125B which extends between the first securing element 123A as far as the second securing element 123B via the second redirection element 122.

In the version shown, the first and second wire portions 125A, 125B are separate and different from each other.

In another version, there may be provided a wire with a closed ring or a belt with a closed ring with a flattened section.

The two opposite ends of the first and second wire portions 125A, 125B are fixed to the first and second securing elements 123A, 123B, respectively, which are engaged in different portions of the first and second securing elements 123A, 123B.

The wire 125 may have a virtually circular cross-section.

In order to extend the leg 3 of the support 1, there is provision first for unblocking the blocking device 100 by means of the control element 7, so as to unblock the first blocking device 10 and the second blocking device 20 in order to make the second section 5 and third section 6 of the leg able to be moved in translation with respect to the first section 4 of the leg. After unblocking the blocking device 100 by means of the control element 7, there is provision for moving the second section 5 away from the first section 4, by gripping the control element 7 which is fixedly joined to the second section 5 and by applying a force in the direction indicated by the arrow F in FIG. 2 to the control element 7 itself.

The presence of the transfer element 31 allows all the movable sections of the leg 3 to be unblocked simultaneously by acting only on the control element 7. Similarly, the transmission device 131 allows simultaneous movement of all the movable sections of the leg 3 by acting only, for example, on the control element 7 or on the second section 5 or generally on one of the movable sections of the leg 3.

After moving the movable sections 5, 6 of the leg 3 until the desired extension is reached, the operator acts on the control element 7 so as to block the blocking device 100, at the same time blocking all the movable sections of the leg 3 as a result of the transfer element 31. The control element 7 comprises a gripping portion 7A which is formed to facilitate the handling by the operator and the actuation of the sections of the leg 3.

Furthermore, in the unblocking configuration, the control element 7 is preferably arranged transversely relative to the longitudinal axis of the sections 4-6 of the leg 3 and this facilitates the handling and actuation by the operator.

Furthermore, this facilitates the actuation of the control element 7 by the operator both in order to extend the leg 3 and to close the leg 3 in the closed configuration.

The control element 7 acts both as a control element for the blocking device 100 and as a control element for the translational movement along the longitudinal axis X in both directions of the arrow F1 of the movable sections of the leg.

In fact, the operator can advantageously grip the control element 7 in order to move the second section 5 and therefore also to pull the third section 6 with translational movement.

Moving the second section 5 in both directions of the arrow F1 causes a corresponding movement of the third leg section 6 as a result of the transmission device 131.

However, the operator could also grip the third section 6 and move it in the direction of the arrow F or in the opposite direction and, as a result of the transmission device 131, this would involve a corresponding translational movement of the second section 5.

Moving the second section 5 in the direction of the arrow F causes the movement of the second redirection element 122 away from the first redirection element 121 and the second securing element 123B.

Therefore, this brings about a movement of the first securing element 123A, which is fixed to the third section 6, in the direction towards the second redirection element 122 and a consequent sliding of the wire 125 about the second redirection element 122.

In this manner, by moving the second section 5, the third section 6 is pulled away from the first section 4, that is to say, it is moved in the direction of the arrow F in FIGS. 2 and 3.

The second section 5 and third section 6 are moved simultaneously and in a virtually synchronized manner with respect to the first section 4.

Advantageously, the second section 5 and third section 6 are moved by a corresponding movement amount.

With reference to FIGS. 8 to 13, there is described an additional preferred embodiment of the invention, in which members corresponding to the version described above are indicated with the same reference numerals accompanied by a prime symbol and will not be described in detail.

In the preferred embodiment described below with reference to FIGS. 8 to 13, each leg 3' has a form different from that described above.

The first section 4' comprises an external shell 40 which is internally hollow and which is formed so as to define a longitudinal slot 41; the second section 5' comprises an intermediate shell 50 which is internally hollow and which is slidingly received in the external shell 40; the third section 6' comprises a single tube 60 which is slidingly received in the intermediate shell 50.

The leg 3' is provided at the first end 3'A thereof with hinge elements 35' in order to hinge the leg 3' to a cross-member of a tripod.

If the leg is not being used in a tripod, it is provided at the first end thereof with fixing elements for a video-photographic equipment item.

The leg 3' is provided with a blocking device 100' having a control element 7' for blocking/unblocking at the same time all the sections of the leg. The blocking device 100' is provided at the first section 4' and is intended to interact with the second section 5' and the third section 6' in order to block/unblock the sliding thereof and with respect to the first section 4'.

In the version shown, the blocking device 100' comprises a first blocking device 10' and a second blocking device 20' which are intended to interact in order to block/unblock the first section 4' and the second section 5' and the second section 5' and the third section 6', respectively, in order to block/unblock the sliding thereof and with respect to the first section 4'.

The blocking device 100' further comprises a transfer element which is interposed between the first blocking device 10' and the second blocking device 20' in order to transmit the blocking/unblocking movement of the first blocking device 10' to the second blocking device 20' so as to unblock simultaneously all the movable sections of the leg.

The blocking device 100' is similar to the one described above and will not be described in detail below.

There can be used in the invention blocking devices which are different from the one described above and which are suitable for blocking/unblocking the sections of the leg at the same time.

There are provided blocking devices which are provided with a control element which is movable in order to block/unblock the blocking device and which can be positioned in an unblocking position in such a configuration that the control element can be gripped by an operator in order to move the sections of the leg.

The control element 7' of the blocking device 100' is formed by a lever which can be actuated and oscillated between a blocking position K which is shown in the Figures and in which the control lever 7' is substantially beside the leg 3' and the sections 4'-6' of the leg 3' are mutually blocked, and a release position which is not shown and in which the lever 7' is arranged substantially transversely with respect to the leg 3' and the sections 4'-6' of the leg 3' itself are mutually unblocked and can be moved along the longitudinal axis X of the leg 3 by means of the control lever 7' itself.

The leg 3' is further provided with a transmission device 131' which can better be seen in FIGS. 10-13 and which connects the first section 4', the second section 5' and the third section 6' in such a manner that the movement of the second section 5' with respect to the first section 4' brings about a similar movement of the third section 6', as better explained below.

The transmission device 131' comprises a first redirection element 121' and a second redirection element 122' which are secured to the second section 5' in longitudinally opposite positions 5C, 5D.

The first redirection element 121' comprises a first idler pulley which is rotatably mounted at a first longitudinal end 5C of the intermediate section 5' and which is rotatable about an axis Y which is perpendicular to the longitudinal axis X of the leg 3'.

The second redirection element 122' comprises a second idler pulley which is rotatably mounted at a second longitudinal end 5D of the intermediate section 5' and which is rotatable about an axis Y which is perpendicular to the longitudinal axis X of the leg 3'.

The transmission device 131' further comprises a belt 125' which extends between the first redirection element 121' and the second redirection element 122' in order to transmit the movement between the various sections 4'-6' of the leg 3', as better explained below.

The transmission device 131' further comprises a securing device 123' for securing the belt 125' to the first section 4' and/or the third section 6'.

The securing device 123' comprises a first securing element 123'A which is fixed to the third section 6' and which is intended to fix the belt 125' to the third section 6'. Preferably, the first securing element 123'A is provided in a zone of the third section 6' which is near the first longitudinal end 5'C of the second section 5'.

The securing device 123' further comprises a second securing element 123'B which is fixed to the first section 4' and which is intended to fix the belt 125' to the first section 4'. Preferably, the second securing element 123'B is provided in a zone of the first section 4' near the second longitudinal end 5'D of the second section 5'.

The first securing element 123'A and the second securing element 123'B are formed as a clamp which clamps the belt 125', preventing the relative sliding thereof with respect to the first securing element 123'A and the second securing element 123'B, respectively.

Advantageously, the first securing element 123'A and the second is securing element 123'B are provided with small teeth which engage with the belt 125'.

In this version, the transmission device 131' is received inside the intermediate shell-like member 50 and therefore the elements of the transmission device are protected from potential impacts without additional protection components being provided.

The belt 125' is advantageously of annular form and is wound between the redirection and securing elements.

The belt 125' is a single member which is formed in a ring-like manner and comprises a first belt portion 125'A which extends between the first securing element 123'A as far as the second securing element 123'B via the first redirection element 121' and a second belt portion 125'B which extends between the first securing element 123'A as far as the second securing element 123'B via the second redirection element 122'.

The first belt portion 125'A comprises a first portion 8 which extends between the first engagement element 123'A and the first redirection element 121' and a second portion 8A which extends between the first redirection element 121' and the second engagement element 123'B.

Similarly, the second belt portion 125'B comprises a first portion 9 which extends between the second engagement element 123'B and the second redirection element 122' and a second portion 9A which extends between the second redirection element 122' and the first engagement element 123'A.

The first belt portion and the second belt portion 125'A, 125'B are joined at the securing elements 123'A, 123'B.

The first belt portion and the second belt portion 125' are engaged at different portions of the first and second securing elements 123A, 123B.

In another version, there may be used a cord or a wire as a transfer element of the transmission device.

In another version, the first and second belt portions are separated at the securing elements, the belt is formed as two different members.

During operation, in order to position a tripod, or generally to vary the extension of a leg 3', the operator provides for an action on the control element 7' in order to unblock the blocking device 100' by simultaneously unblocking the first blocking device 10' and the second blocking device 20'. The operator, with the control element 7' and the blocking element 100' in an unblocking position, maintains the grip on the control element 7' and provides for moving it in the direction indicated by the arrow F away from the cross-member 2 or generally away from the hinge element 35', in order to configure the leg 3' in a desired extended configuration.

This movement of the control element 7' involves a corresponding movement of the second section 5', to which the control element 7' is fixedly joined and therefore, as a result of the provision of the transmission device 131, of the third section 6'.

Figure 10:
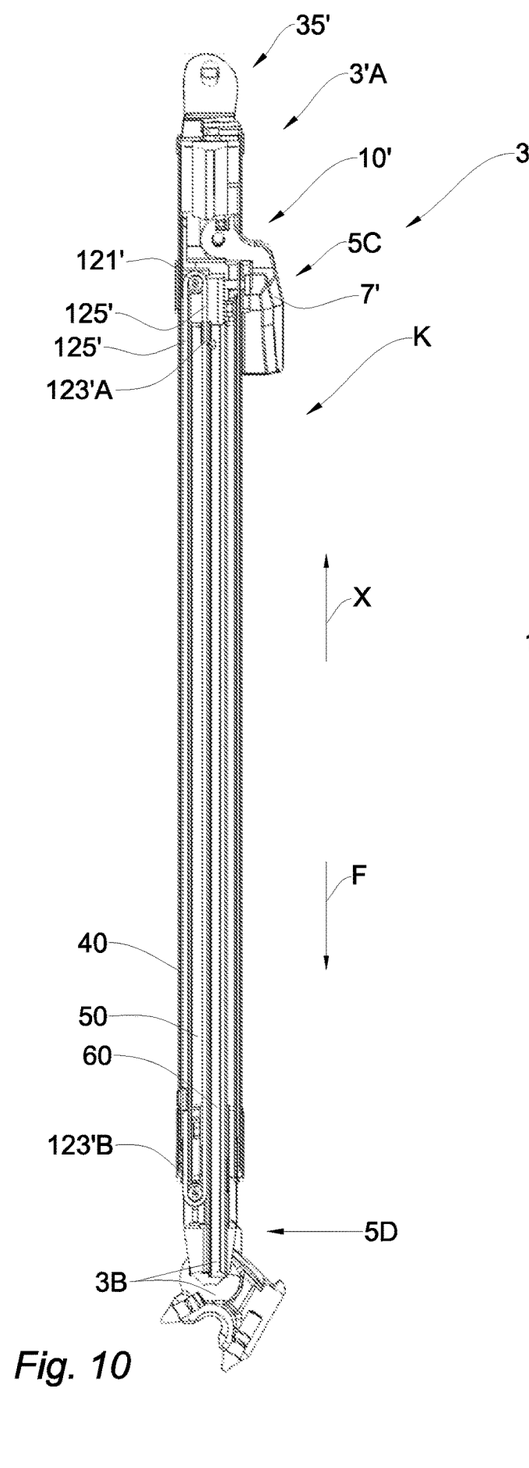
FIG. 10 is a cross-section of FIG. 9.
Figure 10A:
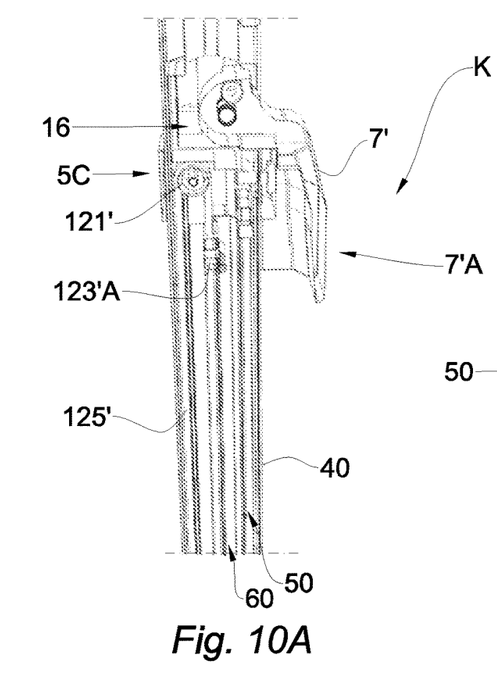
FIGS. 10A and 10B are two enlarged views of two details of FIG. 10.
Figure 10B:
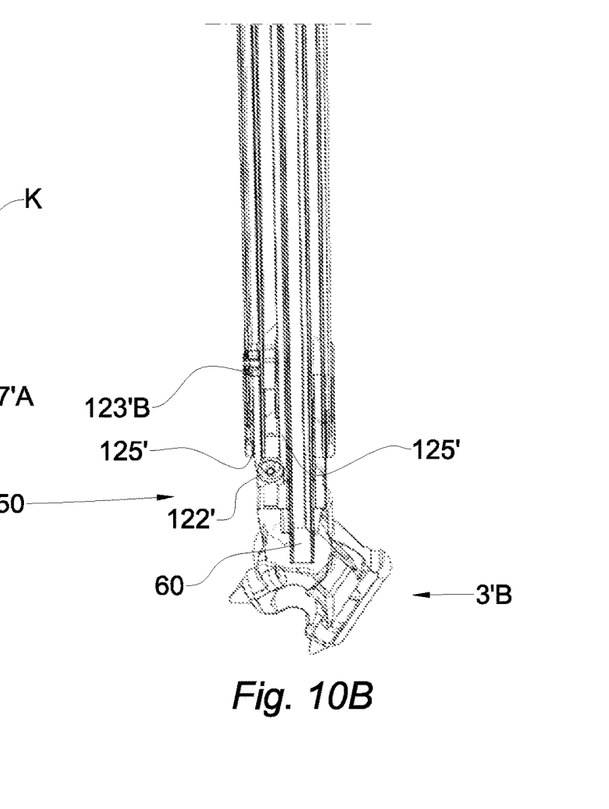
Figure 11:
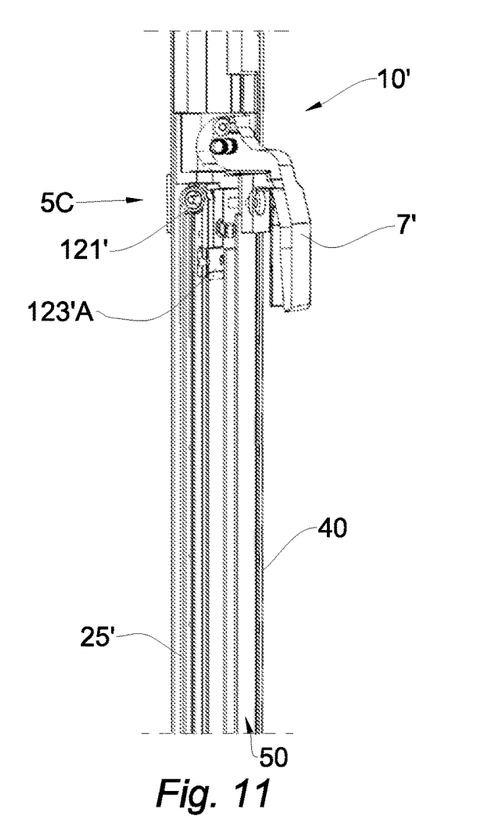
FIG. 11 is an enlarged cross-section of a detail of the leg of FIG. 8 with a different angulation.
Figure 12:
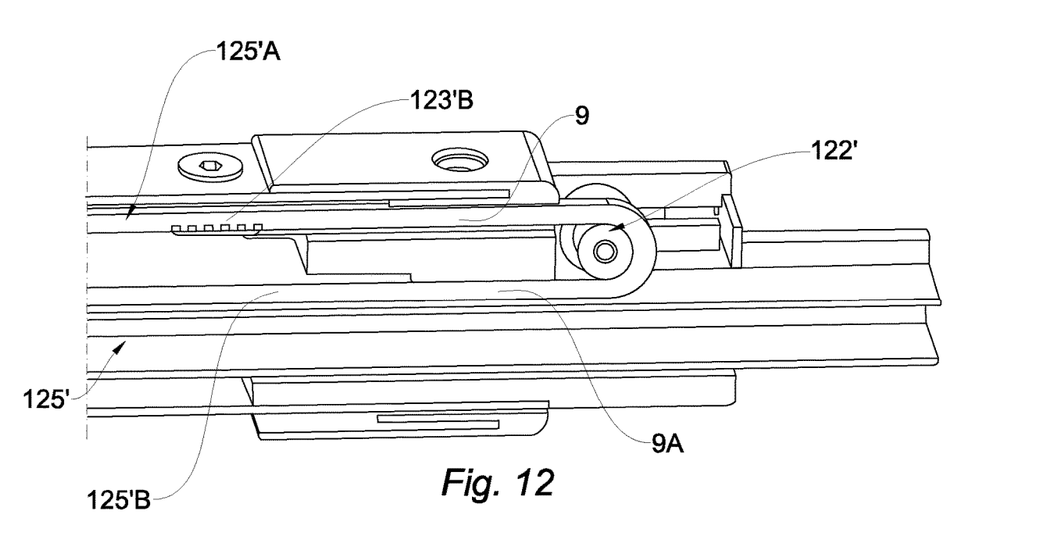
FIGS. 12 and 13 are enlarged cross-sections of details of the leg of FIG. 8.
Figure 13:
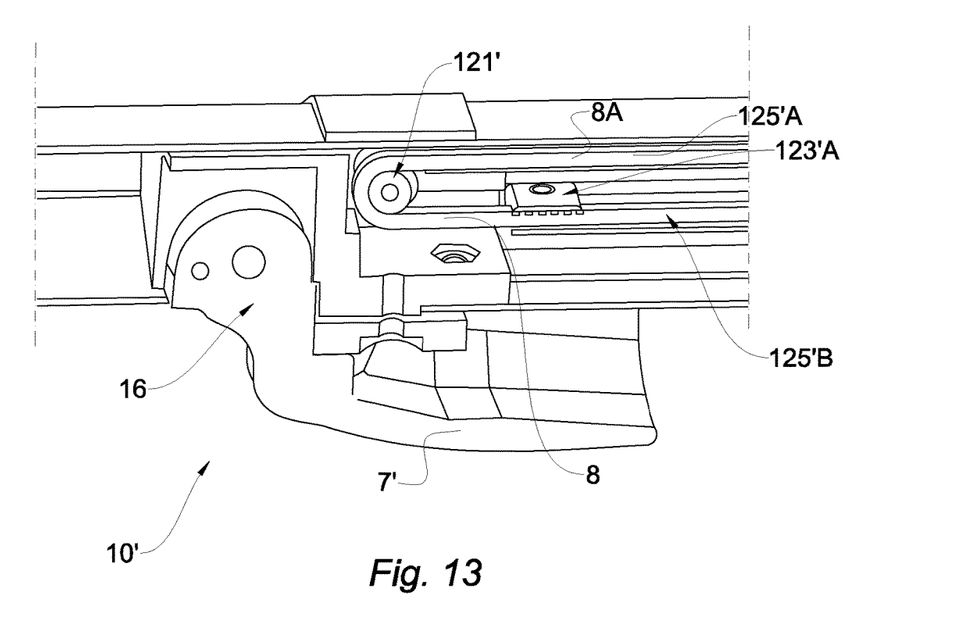

Advantageously, by acting on the control element 7', there is generated a movement of the second section 5' away from the cross-member in the direction of the arrow F and the sliding thereof inside the external shell 4' of the first section 4 in the direction indicated by the arrow F in FIG. 10.

The presence of the transmission device 131' allows the movement imparted by the operator to the second section 5' to be transmitted to the third section 6', correspondingly moving the third section 6' away from the first section 4'.

In fact, by moving the second section 5' in the direction of the arrow F, the second redirection element 122' is moved away from the second engagement element 123'B.

Since the belt 125' has a constant length and because it is engaged by means of the first engagement element 123'A and the second engagement element 123'B, respectively, with the first section 4' and the third section 6', this movement brings about sliding of the belt 125' about the first redirection element 121' and the second redirection element 122' and movement of the second engagement element 123'B towards the second redirection element 122'.

Therefore, this involves the third section 6' being drawn by the second section 5' away from the first section.

Therefore, a relative movement is generated between the redirection elements 121', 122' and the engagement elements 123'A, 123'B which varies the extension of the belt portions which extend between the redirection elements and the respective engagement elements 123'A, 123'B.

Considering a first belt portion 125A which extends between the first engagement element 123'A and the second engagement element 123'B via the first redirection 121' and a second belt portion 125B which extends between the first engagement element 123'A and the second engagement element 123'B via the second is redirection 122', the overall extension of the first and second belt portions 125'A, 125'B remains constant during the movement of the sections of the leg 3'.

By moving the sections 4'-6' of the leg 3', however, the extension of the first portion 8, 9 and the second portion 8A, 9A, which extend between the respective redirection element 121', 122' and the engagement elements 123'A, 123'B, varies for each belt portion 125'A, 125'B, respectively.

By moving the second section 5' away from the first section 4', as mentioned, the second redirection element 122' moves away from the second engagement element 123'B and therefore tends to increase the extension of the first portion 9 which extends between the second engagement element 123'B and the second redirection element 122'. This causes the first engagement element 123'A to be returned in the direction towards the second redirection element 122', reducing the extension of the second portion 9A which extends between the first engagement element 123'A and the second redirection element 122'.

Vice versa, for the second belt portion 125A, it increases the extension of the first portion 8 which extends between the first redirection element 121' and the first engagement element 123'A and reduces the extension of the second portion 8A which extends between the first redirection element 121' and the second engagement element 123'A.

In this manner, by moving the second section 5', the third section 6' simultaneously also moves by a corresponding movement amount.

When the operator has achieved the desired extension of the leg 3', he/she provides for blocking the blocking device 100' by acting on the control element 7' so as to block the sections 4'-6' in the desired extension configuration.

Similarly, in order to close the tripod or to reduce the extension of the leg 3', the operator unblocks the blocking device 100' by acting on the control element 7' so as to unblock the sections 4'-6'. Subsequently, the operator acts on the control element 7' or on a movable section 5', 6' of the leg 3' by moving it in the direction towards the first section 4' so as to reduce the extension of the leg 3' and, finally, blocks the blocking device 100' so as to block the sections 4'-6' in the desired configuration.

As set out above, the unblocking operations, blocking movement are carried out by means of the control element and without any need for the operator to remove his/her hand from the control element.

Furthermore, by actuating the blocking device, it is possible to unblock/block the various blocking devices of each movable section of the leg by means of the transfer element and, by moving the gripping portion of the blocking device, to move, as a result of the transmission device, all the movable sections of the leg.

The provision of a transfer element for transferring the blocking/unblocking to all the blocking devices of each section of the leg and a transmission device for transmitting the movement from the blocking device to all the movable sections of the leg, which is different from the transfer element, allows an increase in the stability of the support of the invention.

All the above-mentioned operations can readily be carried out with a single hand while maintaining the support in a stable manner with the other hand.

The present invention therefore solves the problem set out above with reference to the cited prior art.

Naturally, in order to comply with specific and contingent application requirements, a person skilled in the art may apply to the above-described invention additional modifications and variants which are still within the scope of protection as defined by the appended claims.

The invention claimed is:

1. A support for video-photographic equipment comprising:
    at least one leg which can extend in a telescope-like manner between a retracted configuration and an extended configuration and comprises a first section, a second section, which is engaged in an axially sliding manner with the first section, and a third section, which is engaged in an axially sliding manner with the second section;
    a blocking device which is provided on one of the sections of the leg and which is configured to interact with the sections in order to block or unblock the relative axial sliding thereof and which is provided with a control element which is connected to the second section and which can be actuated in order to control the blocking or the unblocking of the blocking device,
    a transmission device which connects the first, second, and third sections in such a manner that the movement of the second section with respect to the first section brings about a similar movement of the third section with respect to the second section;
    wherein the transmission device comprises at least a first redirection element and a second redirection element which are secured to the second section in longitudinally opposite positions, a first securing element which is fixed to the third section, a second securing element which is fixed to the first section, and at least one wire which extends between the first redirection element, the first securing element, and the second redirection element and the second securing element in order to transmit the movement between the first section, the second section, and the third section.

2. The support according to claim 1, wherein the second securing element is positioned so as to be interposed between the first redirection element and the second redirection element at opposite sides with respect to the securing element.

3. The support according to claim 1, wherein the first redirection element comprises an idler pulley which is mounted so as to be rotatable on the second section and the second redirection element comprises an additional idler pulley which is mounted so as to be rotatable on the second section in a longitudinally opposite position with respect to the first redirection element.

4. The support according to claim 1, further comprising adjustment elements for adjusting the position of the first redirection element and/or the second redirection element in order to adjust the tension of the wire.

5. The support according to claim 1, wherein the control element is provided on the second section and is fixedly joined in terms of translational movement along the longitudinal axis to the second section and comprises a gripping portion which is configured to be gripped in order to control the longitudinal translational movement of the second section.

6. The support according to claim 1, wherein the wire comprises a belt with a flattened cross-section with a smooth or toothed section or a cord with a substantially circular cross-section, the wire being formed in the manner of a closed ring or comprising two different portions which are separate and different from each other.

7. The support according to claim 1, wherein the securing element comprises a clamp which is configured to clamp the wire in order to block the sliding thereof with respect to the securing element.

8. The support according to claim 1, wherein the first section comprises an external shell member which is internally hollow and in which there is slidingly received an intermediate shell member of the second section, which receives with a capacity for sliding an internal shell member of the third section, the transmission device being received inside the intermediate shell member.

9. The support according to claim 1, wherein the first section comprises a pair of external parallel tubes, the second section is formed by a pair of intermediate parallel tubes which are substantially coplanar with the external tubes of the first section and which are interposed between the external tubes of the first section, and the third section is formed by a single internal tube, the transmission device preferably being received between the intermediate tubes and the external tubes.

10. The support according to claim 1, wherein the blocking device comprises a first blocking device, which is provided between the first section and the second section in order to block or unblock the relative axial sliding of the first section with respect to the second section, and a second blocking device, which is provided between the second section and the third section in order to block or unblock the relative axial sliding of the second section with respect to the third section, and a transfer element, which connects the first blocking device and the second blocking device in such a manner that the movement of the first blocking device brings about a similar movement of the second blocking device so that the blocking and the unblocking of the first and second blocking devices are simultaneous, and an adjustment member of the second blocking device, which is arranged in the region of the first blocking device in order to adjust the second blocking device by means of the transfer element.

11. The support according to claim 1, wherein the first section is provided, at a longitudinal end thereof, which during use is opposite a support surface directed towards a video-photographic equipment item, with a reinforcement element, which connects the ends of the external tubes and which defines a sliding cavity for the sliding of the intermediate tubes of the second section and a second sliding cavity for the sliding of the internal tube of the third section.

12. The support according to claim 1, wherein the second section is provided, at a longitudinal end thereof, which during use is opposite a support surface of a video-photographic equipment item, with an additional reinforcement element, which connects the ends of the intermediate tubes of the second section and which defines a sliding seat for the sliding of the internal tube of the third section.

13. The support according to claim 1, wherein the first blocking device comprises a first runner which is movable away from and towards the first section in order to block/unblock the relative sliding action thereof between the first section and second section and a first actuator which is connected to the control element and the first runner so as to move the first runner away from and towards the first section when the first actuator is moved by the control element, the first runner being movable in a radial direction in order to block/unblock the first section; a resilient pushing element preferably being provided and formed in order to urge the first runner in a direction away from the first section.

14. The support according to claim 1, wherein the second blocking device comprises a second runner which can be moved away from and towards the third section in order to block or unblock the relative sliding thereof with respect to the second section and a second actuator, which is connected to the second runner and the transfer element in such a manner that the second runner is moved away from and towards the third section when the second actuator is moved by the transfer element; the second runner being movable in a radial direction in order to block/unblock the third section, a resilient pushing element being provided and formed in order to urge the second runner in a direction away from the third section.

* * * * *